Feb. 4, 1936.　　　H. SCHLACHTER　　　2,029,674
WINDMILL
Filed Feb. 13, 1935　　6 Sheets-Sheet 1
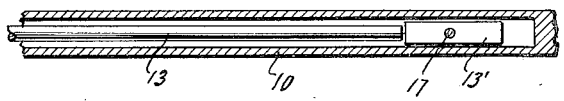
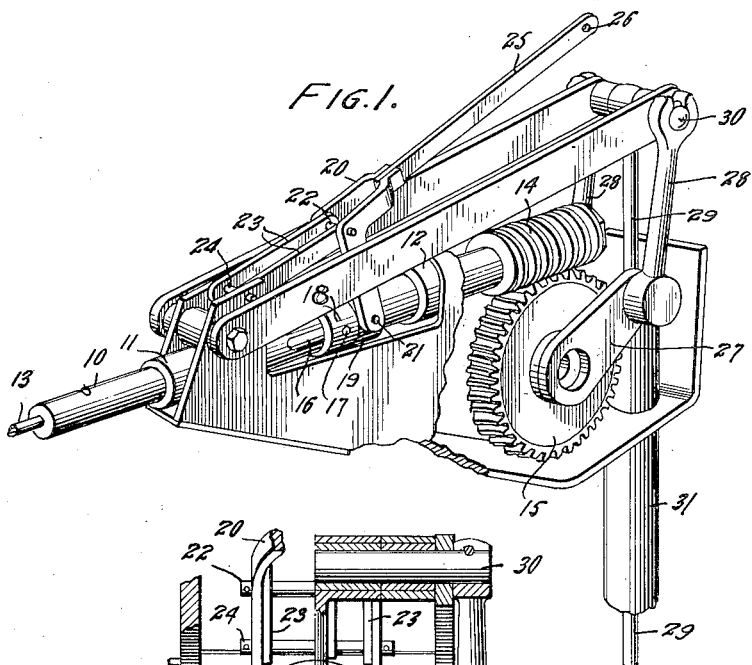
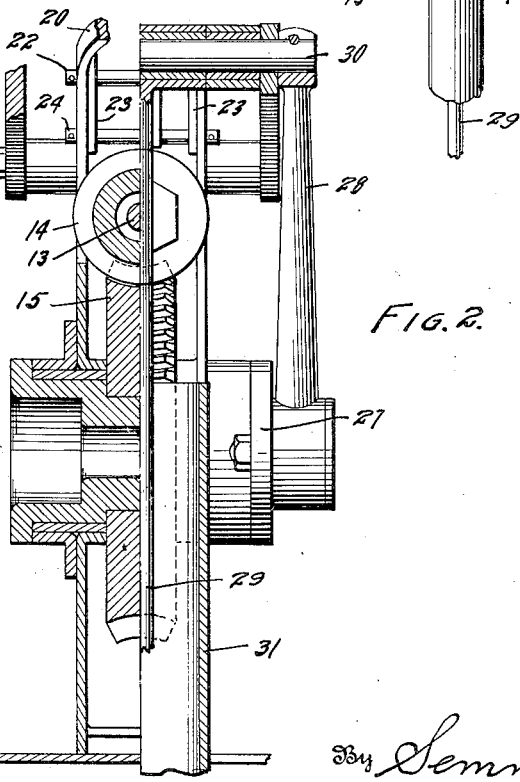
Inventor
HENRY SCHLACHTER
By Semmes & Semmes
Attorneys

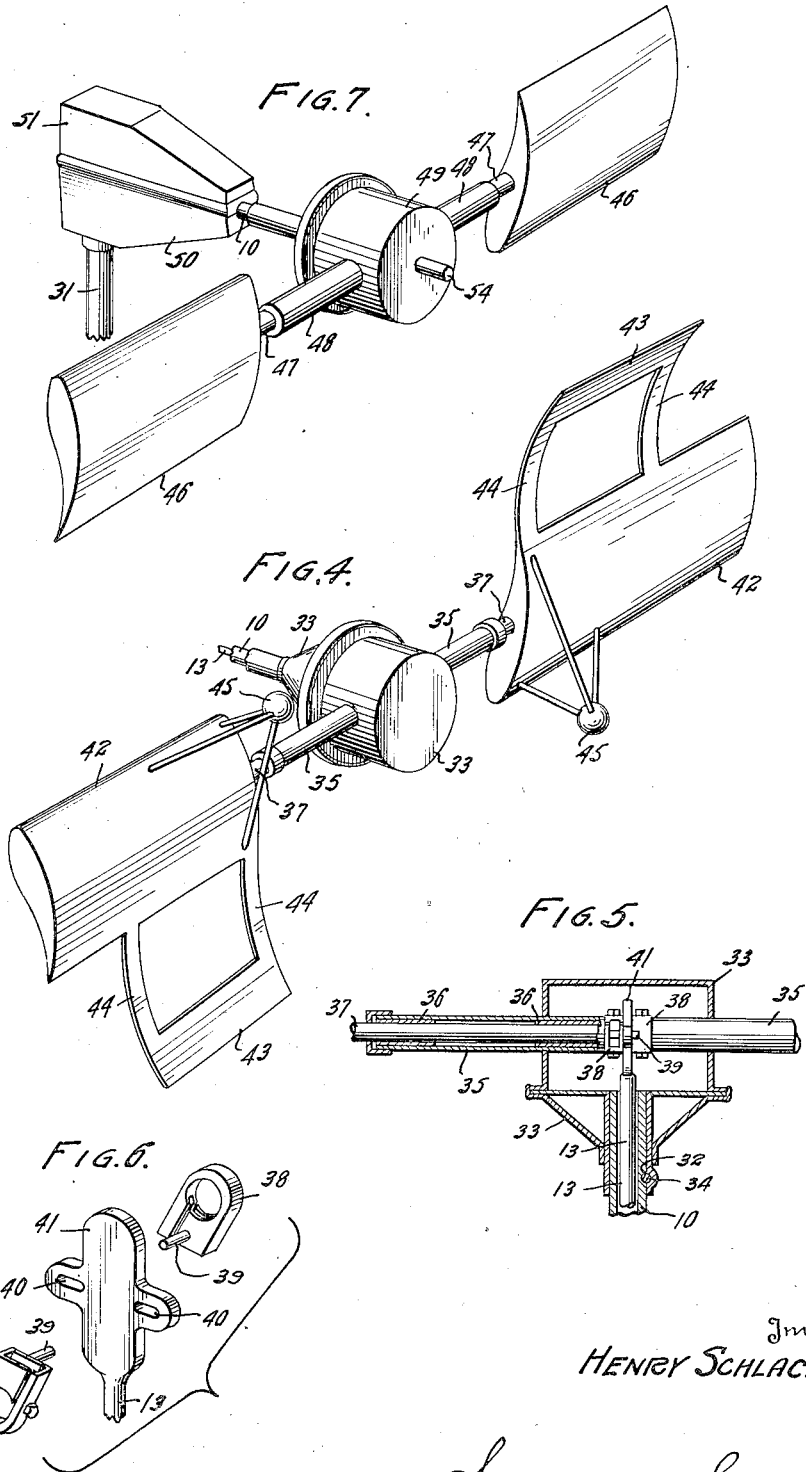

Feb. 4, 1936. H. SCHLACHTER 2,029,674
WINDMILL
Filed Feb. 13, 1935 6 Sheets-Sheet 3
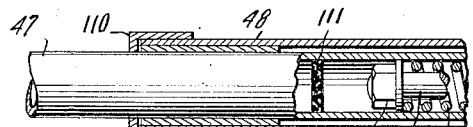
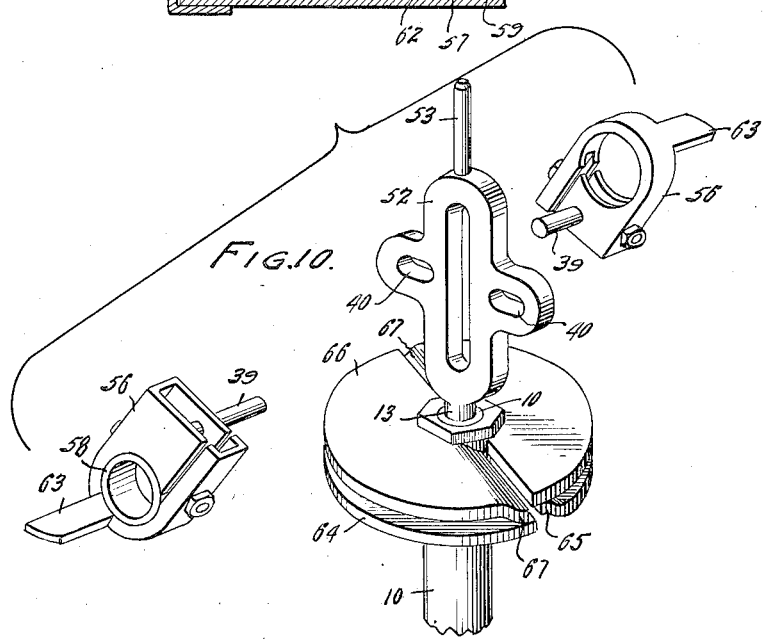
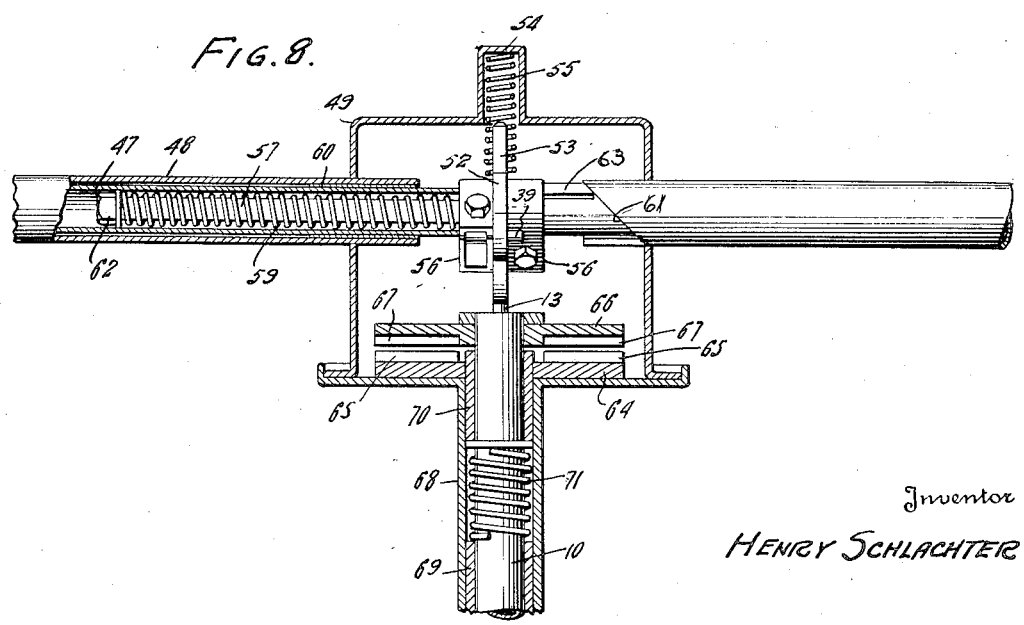
Inventor
HENRY SCHLACHTER
By Semmes & Semmes
Attorneys Feb. 4, 1936.  H. SCHLACHTER  2,029,674
WINDMILL
Filed Feb. 13, 1935  6 Sheets-Sheet 4
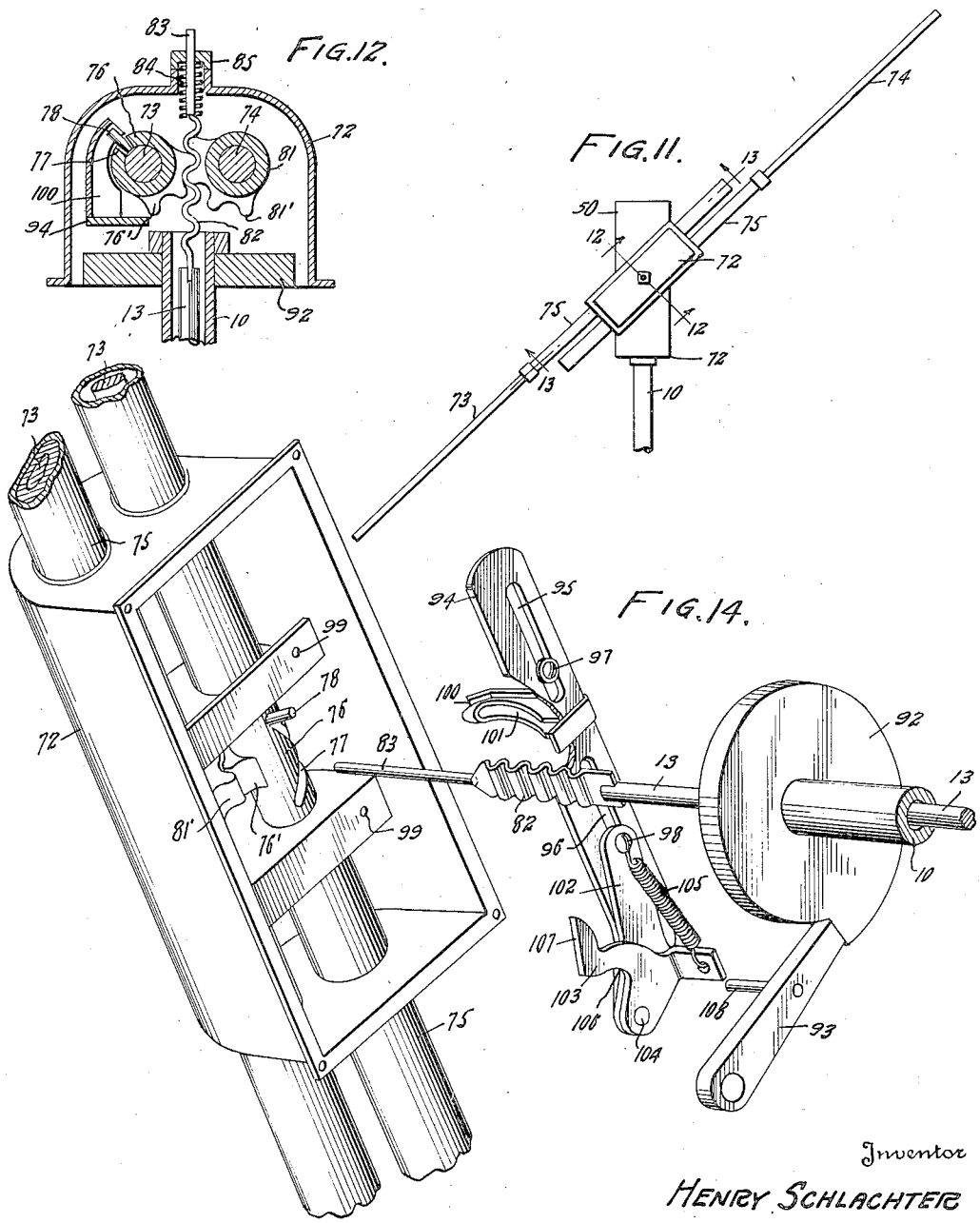
Inventor
HENRY SCHLACHTER
By Semmes & Semmes
Attorneys Feb. 4, 1936.                H. SCHLACHTER                2,029,674
                                WINDMILL
                          Filed Feb. 13, 1935            6 Sheets-Sheet 5

Inventor
HENRY SCHLACTER
By Semmes & Semmes
Attorneys

Patented Feb. 4, 1936

2,029,674

UNITED STATES PATENT OFFICE 2,029,674

WINDMILL

Henry Schlachter, Beatrice, Nebr.

Application February 13, 1935, Serial No. 6,366

11 Claims. (Cl. 170—75)

The present invention relates to improvements in windmills and other similar wind motors and it has for its object the provision of a windmill which will be more efficient, lighter in weight and lower in cost than the prior windmills.

It is a continuation in part of my pending application Serial No. 539,008, filed May 21, 1931.

Another object of my invention is the provision of a blade of efficient section.

It is also my object to provide a windmill design in which the blades will travel at the most efficient speed.

Another of my objects is the provision of a windmill construction in which the number of blades is reduced to a minimum so that the blades will not interfere with one another or, in other words, so that each blade will operate in undisturbed air.

Another object which I have in view is the use of sheet metal in frame construction to thereby provide a very light weight and to thus materially reduce the load on the other parts of the machine.

Another object of the invention is the provision of improved governing means which are more effective than those heretofore used.

My windmill design furthermore contemplates the enclosure of all moving parts to provide protection from the elements and to provide means for adequate automatic lubrication. Along with this I have provided for ease of erection which is largely due to the extremely low weight of the windmill.

A still further object of my invention is to provide a clutching mechanism for clutching a high speed wheel to the pumping mechanism, which is greatly improved in structure, and also to provide greatly improved controlling means for the clutching mechanism operative at a predetermined speed of rotation to give desired improved results.

Having in view these objects and others which will be pointed out in the following description, I will now refer to the drawings, in which Figure 1 is a view in perspective of the working parts of the windmill motor, parts being broken away to disclose interior structure;

Fig. 2 represents two sections, both looking from the rear or toward the wind wheel end of the motor, the left hand half representing a section through the far half of Figure 1, part of the section being vertical through the axis of the worm wheel 15 and passing through the worm 14; the section includes also a break through one of the levers 20 forward of the main portion of the section; the right hand half of Figure 2 represents a vertical transverse section through the axis 30 and including only the far half of the motor in Figure 1;

Fig. 3 is a view in longitudinal section of a portion of the shaft 10 showing the relation between the rod 13 and the short rod 13';

Fig. 4 is a view in perspective showing one form of my wind wheel;

Fig. 5 is a median sectional view through the housing of the wind wheel shown in Figure 4;

Fig. 6 is a view in perspective of the mechanism inside the housing shown in Figure 5;

Fig. 7 is a view in perspective of a complete mill;

Fig. 8 is a sectional view through the housing of the wind wheel shown in Figure 7, the figure also showing the mechanism inside the housing;

Fig. 9 is a view partly in plan and partly in section of a fragment of the structure shown in Figure 8;

Fig. 10 is a view in perspective of the clutch and of the clutch operating mechanism employed in the Figure 7 construction of wind wheel;

Fig. 11 is a view in elevation of the windmill head showing another form of wind wheel, the airfoils being omitted;

Fig. 12 is a sectional view on the line 12—12 of Figure 11, looking in the direction of the arrows;

Fig. 14 is a perspective view of the disassembled mechanism inside the wheel housing of the wind wheel shown in Fig. 11;

Figure 13:
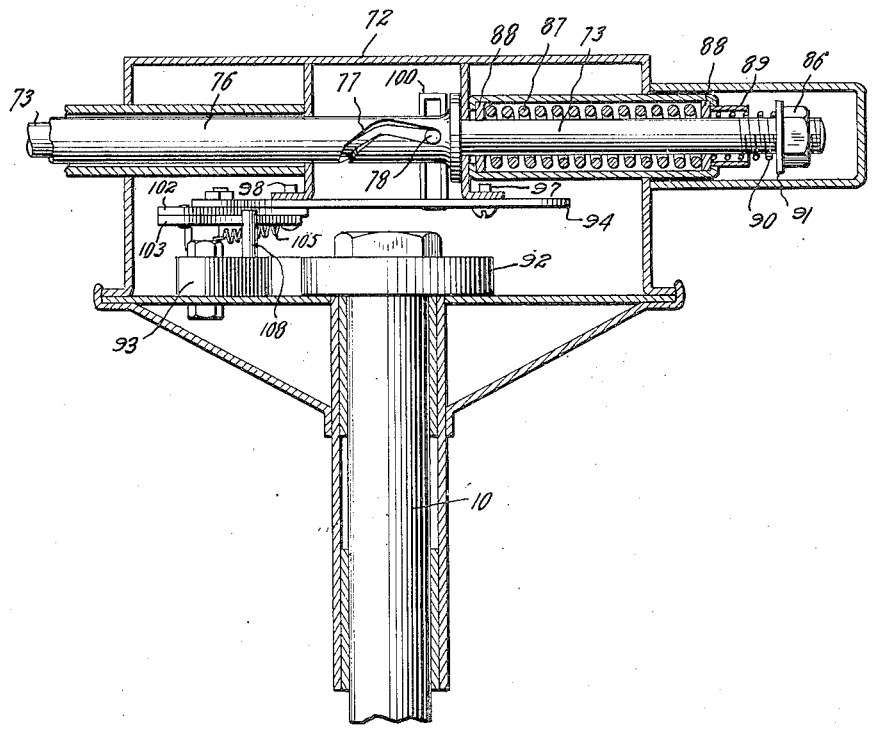
Fig. 13 is a sectional view on the line 13—13 of Figure 11, looking in the direction of the arrows.

The drive shaft 10 of the windmill motor is tubular in form and it has its front and rear bearings at 11 and 12. The rod 13 is within the shaft 10 with which it may rotate but it is mounted in the shaft 10 so that it is slidable relative thereto. The rear end of the shaft is provided with a worm 14 for transmitting power to the worm gear 15. The shaft 10 is provided with a slot 16 for receiving a pin 17 projecting from the rod 13' and passing through the collar 18. The collar 18 is rotatable with the shaft 10 and with the rod 13' but it is slidable with the rod 13' relative to the shaft 10. Adjacent the collar 18 and in the rear thereof is a second collar 19, this collar being non-rotatable but being slidable in a lengthwise direction relative to the shaft 10. The split bell crank 20 embraces the collar 19 to which it is pivotally secured by means of the pins 21. The bell crank 20 is pivotally secured at 22 to a pair of links 23 which in turn are pivotally connected to the frame at 24. The bell crank 20 constitutes a part of a lever 25 which is provided with an aperture 26 at its rear extremity for receiving the upper end of a pull out wire. The purpose of this construction of course is to provide a means for throwing the windmill into and out of operative position. This is accomplished by depressing the rear end of the lever 25 to cause the forward movement of the rod 13 relative to the shaft 10 and to thereby throw the mechanism out of gear, as will be more fully described in connection with the description of the wind wheels themselves.

The worm gear 15 is driven from the worm 14. Secured to the worm gear 15 is a pair of cranks 27, only one of which is shown. The cranks 27 actuate the pitmans 28 which are connected to a reciprocating pump rod 29 enclosed within the tubular stem 31 by means of the wrist pin 30.

The shaft 10 is provided at its forward extremity with a notch 32 whereby the wind wheel is secured to the shaft 10 by means of structure to be subsequently described. It will be obvious that when the shaft 10 is rotated through the action of the wind on the wind wheel, this rotary motion will be transmitted through the worm 14 and worm gear 15 and will be finally converted into up and down movement of the pump rod 29.

Referring now to Figure 4 which represents perhaps the most simple form of wind wheel embodying the principles of my invention, the shaft 10 and the rod 13 previously described are shown in their relation to the wind wheel as a whole. The wind wheel hub is indicated by the numeral 33, this hub consisting of two parts which are releasably secured together to give access to the mechanism inside. The shaft 10 is secured to one of the hub parts 33 in the manner shown in Figure 5 with a pin 34 seated in the notch 32 of the shaft 10. The movement of the wind wheel is thus communicated to the shaft 10. Other parts of the wind wheel are permanently secured to the hub 33 as by brazing or welding.

The radial tubes 35 pass through one of the hub parts 33 to which they are permanently secured. These radial tubes 35 are bushed at their inner and outer extremities to provide bearings for the blade stems 37. Referring now to Figure 6, the mechanism includes two clamps 38 for engaging the inner extremities of the blade stems 37, the clamps being provided with bolts for rigidly securing the clamps to the stems. These clamps are provided with inwardly projecting pins 39 which operate in slots 40 of the head 41 of the rod 13. Any movement of the rod 13 in either direction of its length will thus be communicated through the head 41 to the blade stems 37, rocking the blade 42 about the blade stems 37 as axes. The proportion of the parts is such that the rod 13 will move far enough to cause rotation of the blade stems 37 through an arc of approximately 90 degrees. This will turn the blades from their normal running position to a position substantially parallel to the wind so that no rotation whatever takes place. Thus by depressing the lever 25, the mill may be stopped by rocking the blades into their position, substantially parallel to the wind.

The blades 42 are double surface airfoils of efficient section, both surfaces being fastened to the blade stems 37 by means of screws, spot welding or other convenient means. The edges of the sheet form the trailing edge of the blade and are fastened together very neatly, preferably by spot or seam welding to leave a thin trailing edge and to thus promote efficiency.

It will be obvious that this windmill attempts to apply some of the principles of modern aerodynamics to windmill construction. One of the properties of airfoils is that the airfoil should operate at a certain angle relative to the air stream in order to obtain the maximum lift or torque, in this case. If this angle is exceeded, the stream line flow is broken up and the airfoil becomes inefficient. In general, it can be said that this angle must be less than 20 degrees. The present day windmill has the blades fixed at about 60 degrees with the result that the starting torque is comparatively low. Experience with fixed blades has, however, proved that this angle gives the best compromise between running speed and starting torque.

It is obvious that if the blades were pivoted and caused to operate continually at the best angle to the air stream, much more power could be derived from a given blade surface. It has also been demonstrated that a wheel with two blades will develop more power than any of the old style wheels with fifteen to twenty-five or more blades, the explanation of this being that the blades interfere with one another and each blade is compelled to operate in air which has been disturbed by other blades. They are efficient only at certain speeds determined by the wind velocity and the wheel velocity.

In previous attempts to hold these blades at the proper pitch, centrifugal force has been utilized, but at low speeds the force available is so low that it will not overcome the friction of the various bearings. Furthermore, varying loads cause this method to be inaccurate.

Within the range of desirable working angles the center of pressure movement is very small. Therefore, if the blade is pivoted at or as near as possible to the center of pressure axis of the airfoil, it will require only a small force to maintain this angle. In order to provide this force a stabilizer 43 may be applied in rear of the blade and it should be set at the proper angle to obtain the maximum lift or torque so that the air stream will hold the blade at the desired angle. If the blade length is two-thirds the radius of the wheel, as for example, if a wheel sweeping a six foot circle is provided with a two foot blade and the stabilizer or tail is mounted on the inner end, the entire blade will operate at satisfactory angles of attack throughout the entire speed range although as the speed of rotation increases, the outer end of the blade operates at increasingly smaller angles of attack.

For example, if a six foot wheel moves at 480 R. P. M. in a ten miles per hour breeze and if the inner end of the blade is held at sixteen degrees to the relative wind, the outer end will be operating at about six degrees due to the increased velocity of the outer portions of the blade. It is found that the best results are obtained if a stop is provided so that the blades can not swing around within six or eight degrees of the plane of rotation as the torque is highest at about this angle, the exact angle being dependent on the particular airfoil section used. The stop is provided in the head of the rod 13 which limits the movement of the rod 13 in both directions. By using a straight stabilizer blade as shown at 43, or in other words a blade which is not warped as in a true screw, maximum starting torque and ease of manufacture are obtained.

If the wind velocity increases and the load remains constant, there is a tendency for the speed of the wheel to increase. As has already been observed, the angle of attack of the outer portion of the blades traveling at high speeds is small. Another property of airfoils is that, as the angle of attack decreases, the center of pressure moves toward the rear or trailing edge of the section. The total pressure on a section also increases with the square of the wind velocity so that an increasingly large force is applied to the blade back of the axis of the blade stem as the speed of the blade increases. The stabilizer blade 43 is therefore provided with flexible, resilient arms 44. To resist this force the arms 44 flex and allow the blade to swing out from the wind until a state of equilibrium is reached. By making the stabilizer or tail as light as possible and mounting it on the inner end of the blade, the effect of centrifugal force on it is reduced. If blades and stabilizers are not made as light as possible, this force must be overcome by the use of properly placed weights 45. The function of the weights is to neutralize the tendency, due to centrifugal force, of the blades and stabilizers to remain in the plane of rotation, thereby resisting the tendency of the wheel to slow up in high winds.

Another mechanism for utilizing the high speed wheel is shown in Figures 7, 8, 9, and 10. In this construction the blades are arranged to move axially under the influence of centrifugal force as well as to pivot into and out of the wind. The wheel itself is much the same as that in the Figure 4 construction, consisting of blades 46 without stabilizers. The blades are secured to blade stems 47 which are slidable in tubes 48, these two members being similar in most respects to the stems 37 and to the tubes 35 in the Figure 4 construction. The tubes 48 pass into the hub 49 and in integral construction therewith. This hub is adapted for connection with the shaft 10 of the wind-mill motor. The motor in both constructions is enclosed within a casing 50 having a hood 51 which protects the motor mechanism from rain and grit and which conserves the lubricant. While this construction is used with both the Figure 4 and the Figure 7 type of wheel, it is best shown in Figure 1. This casing is provided with a tubular stem 31 which is also shown in Figures 1 and 2.

The rod 13 in the Figure 7 construction is provided with a head 52 with stem 53 shown in Figure 10. This form is similar to that shown in Figure 6, the main difference being the presence of a stem 53 projecting from the head 52. The hub 49 is provided with a tubular socket member 54 for receiving the projecting stem 53 in the manner shown in Figure 8. A coil spring 55 is seated in the socket member 54 surrounding the projecting stem 53 and having its inner end bearing against the head 52. The blade stems 47 are fitted with collars 56 the structure of which is shown in Figure 10. A spring bolt 57 passes through the bushing 58 against which the inner end of the spring 59 bears. The bolt 57 thus takes up the centrifugal force due to the rotation of the blades, through the springs, the bushings being held securely clamped in the ends of the blade stems 47. Since the spring bolt 57 has freedom of movement, the spring pressure exerted on each blade stem will be equal regardless of differences in the tensions of the springs. The sliding movement of the head 52 is limited due to the fact that the spring bolt 57 passes through the elongated slot in the head 52. The tubes 48 are bushed at both their inner and outer ends, the inner bushings being shown at 60 in Figure 8. These bushings are similar to the bushings 36 in the Figure 5 construction. As shown in the Figure 5 construction, the bushings constitute bearings for the blade stems 47. The tubes 48 of the Figure 8 construction differ from those in the Figure 5 construction in that they are cut at 61 to form cam surfaces.

By means of nuts 62 the springs 59 may be properly tensioned during assembly. Then when the speed of rotation of the wind wheel reaches a point where the centrifugal force is able to overcome the pressure of the springs 59, the blades will move axially outward and in so doing, the lugs 63 on the collars 56 will slide on the cam surfaces 61 causing the blade to swing out of the wind through an arc sufficient to hold the speed within the desired limit as determined by the pressure of the springs 59 since the spring 55 is relatively light and has little effect on regulation, serving merely to hold the lugs 63 in contact with the cam surfaces 61.

With this arrangement the starting torque is very low, as would be expected, due to the unfavorable setting of the blades at about 82 degrees to the wind. On the other hand, this setting produces satisfactory operation after the wheel is in motion. It follows that if the wheel can be unloaded and allowed to run free until it attains some speed, it will produce enough power to handle its load easily. I therefore provide a mechanism for utilizing the wind pressure for releasing and loading the wheel, the mechanism being best shown in Figure 10.

The disc 64 is attached to the wheel hub 49 and carries one or more lugs 65 on its inner face. The disc 66 is firmly secured to the outer end of the wheel shaft. This disc 66 carries one or more lugs 67 facing the disc 64 and adapted to cooperate in clutching relation with the lug 65 of the disc 64. The wheel hub is provided with a sleeve 68, both ends of which are bushed to fit freely over the shaft 10 to permit free rotation on and independent of the wheel shaft. The bushing 69 is fitted tightly into the sleeve 68 while the bushing 70 is free to slide axially of the sleeve. Between the bushings 69 and 70 is a spring 71 which tends to push the bushings 69 and 70 away from each other. Since the bushing 70 bears against the hub of the disc 64 the effect of the spring is to force the two discs 64 and 66 apart a sufficient distance such that the lugs on their faces will be out of engagement to permit free rotation of the wheel.

In a light wind when the wheel is standing still or running very slowly, the wind pressure is insufficient to compress the spring 71. This pressure, however, increases with the square of the speed of the blades and therefore soon reaches a considerable magnitude as the wheel gathers speed. The tension of the spring 71 will thus determine the point at which the wind pressure is sufficient to move the discs 64 and 66 together and into clutching engagement to cause the shaft to revolve with the wheel. The higher the velocity of the wind the lower the wheel speeds at which clutching engagement will take place but the torque available is also higher at lower wheel speeds so that the device really engages when the available torque approaches a given amount.

The frictional resistance of the parts is such that the wheel slows down considerably before the clutch disengages. That is, the clutch disengages at a speed much lower than that at which it engages.

Another form of my invention is shown in Figures 11 to 15 inclusive. In this form the same motor is used as that shown in Figure 1, the motor housing being shown at 50 in Figure 11. Secured to the shaft 10 is a wind wheel housing 72 which supports a pair of parallel blade shafts 73 and 74. These shafts have their bearings in sleeves 75 which are permanently secured to the housing 72 in the manner described in connection with the description of the Figure 7 construction. The two shafts project in opposite directions as shown in Figure 11. The shafts 73 and 74 have both a sliding movement and a movement of rotation in their bearings, both of these movements being limited. Both shafts have sleeves in the middle of the housing, the sleeve 76 on the shaft 73 being provided with a curved slot 77 extending through a wall of the sleeve 76. The sleeve receives a pin 78 projecting radially from the shaft 73 so that when the shaft 73 is moved in a lengthwise direction, the pin 78 will travel along the length of the slot 77. The sleeve 76 is further provided with gear teeth 76'. The movements of the shafts 73 and 74 are coordinated by means of the mechanism shown in Figure 12. Meshing with gear teeth 76' and 81' is a double rack 82 positioned between the two gears. This rack 82 is connected at its inner end with the rod 13 of the motor so that when the lever 25 is actuated in a downward direction, a thrust is imparted to the rod 13 for throwing the mill out of operative position. At the outer end of the rack 82 is a stem 83 so that the stem 83 is a unit with the rack 82 and with the rod 13. A spring 84 normally urges the parts into their operative position. For convenience in assembly and for repairing, the housing is provided with a detachable cap 85 through which the stem 83 passes.

The blades being in their operative position, the wind wheel will rotate without its load. As the speed of rotation increases there is a tendency for the shafts 73 and 74 to slide lengthwise in their bearings under the influence of centrifugal force. The mechanism is designed for taking advantage of this factor in picking up the load when a predetermined speed has been reached. For this purpose the shafts 73 and 74 are formed as shown in Figure 13. The inner end of the shaft 73 is screw threaded and provided with a nut 86. Surrounding the shaft 73 is a coil spring 87 having abutments 88 at its inner and outer extremities. Contacting with the outer abutment 88 is a sleeve 89 surrounding a lighter spring 90 which in turn surrounds the outer end portion of the shaft 73. The spring 90 has its outer abutment at 91 in the form of a washer beneath the nut 86. It follows from this construction that when centrifugal force causes the movement of the shaft 73 outwardly it will increase the pressure of the washer against the spring 90 to compress the spring. When the washer 91 contacts with the outer end of the sleeve 89 the pressure will then be exerted against the heavier spring 87 to compress that spring also. During this lengthwise movement of the shaft 73 the pin 78 will travel in the slot 77 and the parts are so proportioned that the pin 78 will reach the middle point in the slot 77 when the washer 91 contacts with the outer edge of the sleeve 89. The purpose of this construction is to provide an automatic clutching engagement by actuating the clutch shown best in Figure 14.

The clutch consists preferably of two elements, a ratchet wheel 92 having one or more teeth and a pawl 93. The ratchet wheel 92 is keyed to the tubular shaft 10. Associated with the clutch is a sliding bar 94 having slots 95 and 96. The pins 97 and 98 pass through the slots 95 and 96 and also through the apertures 99 in the casing 72. The sliding movements of the slide 94 will therefore take place in a lengthwise direction within members of the casing 72. The slide 94 has a bracket 100 secured thereto, this bracket being provided with a groove 101 which cooperates with the pin 78. As the centrifugal force acting on the rotating wheel causes the shafts 73 and 74 to move outwardly, the pin 78 traveling in the groove 77 will exert a force against the bracket 100 to cause sliding movement of the slide 94 in a lengthwise direction. A lever 102 is pivotally connected with the casing 72 through the connection 98. The slide 94 therefore has sliding movement relative to the lever 102. The pin 102' projects from the side of the lever 102 through the slot 96 at the outer extremity thereof. A trigger 103 is pivotally connected at 104 to the lever 102 at its outer extremity. A spring 105 is connected with the pivot 98 and with the trigger 103 in the manner shown in Figure 14. The trigger is provided with a socket at 106 and a straight edge at 107, both of these elements being operative in the actuation of the trigger in its clutch actuating and clutch releasing movements which can best be explained in connection with Figure 15.

Figure 15:
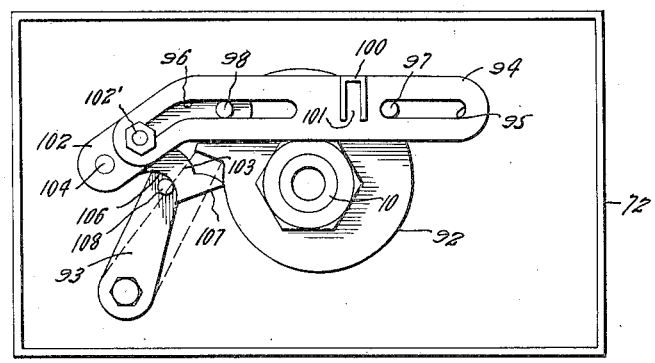
Fig. 15 is a plan view of the inside of the wheel housing and showing particularly the clutch actuating mechanism employed in the Figure 11 construction.

Figure 15 shows the position of the parts in full lines when the clutch is in its released position. The pin 108 projecting laterally from the pawl 93 is seated within the socket 106 of the trigger 103. As the slide 94 is drawn toward the left, as seen in Figure 15, the trigger 103 is swung about the points 98 and 104 until the point of the trigger passes the pin 108 and the straight edge 107 presses against the pin 108. At this point the pawl 93 passes into the dotted line position of Figure 15 and into engagement with the ratchet wheel 92.

I so design my clutch that it does not operate to couple the wind wheel to the pumping mechanism until the wind wheel has attained a relatively high velocity. I also properly proportion and design the moving parts of the clutch and the tension of the spring 105 so that the declutching operation will not take place except at relatively low wind wheel velocities. This feature of my mechanism is of great importance as it prevents the clutch continually floating into and out of engagement at practically constant speed in light winds. It is in general desirable that the wind wheel come almost to a stop or at least to relatively low speeds before de-clutching is effected. The speed of revolution of the wind wheel at which the clutching operation will take place is very important, and will be further amplified and explained in the ensuing description.

In the Figure 12 position the windmill is in gear and the airfoils are held in their operating position. As the speed of rotation of the wind wheel increases, the shafts 73 will tend to move outwardly under the influence of centrifugal force. The outward movement of the shafts 73 is first exerted against the light spring 90 and then against the heavy spring 87. In the meantime the pin 78 travels in the slot 77, the pin 78 reaching the middle point of the slot 77 when pressure on the spring 87 begins to be exerted. The pin 78 acting through the bracket 100 will cause a sliding movement of the slide 94 and will thus cause the trigger 103 to force the pawl 93 into the path of the tooth on the ratchet 92. At this point the shaft 10 is caused to rotate, the rotation being converted into the reciprocatory movement by means of the motor shown in Figure 1.

The slot 77 is so proportioned that, when the wheel is in gear and not rotating rapidly, the blades are held at an angle of 25° to 30° to the plane of rotation. This facilitates starting. As rotational speed increases, the spring 90 is compressed, the pin 78 moves to the center of the slot 77 and the blades are moved to a position within 8° or 10° of the plane of rotation. This is the most effective running position for the particular blade section used.

If the rotational speed of the wheel becomes higher, centrifugal force pulls the pin 78 further along the slot 77 (Fig. 13) and from the shape of the slot, it is evident that this movement will cause the blades to rotate out of the wind, preventing further increase in speed.

In view of the fact that some force is required to move the trigger 103 over the pin 108, the clutch disengages at a speed lower than that at which it engages.

The windmill is designed for automatic lubrication but the details of the lubricating system are merely indicated on my drawings and particularly in Figure 9, the system being duplicated in various parts of the structure but without being shown. The Figure 9 construction shows the use of a gland 110 and of a plug 111 which confine the lubricant and which insure the lubrication of the mechanism without the loss or deterioration of the lubricant.

From the foregoing description it will be seen that I have utilized the principles of modern aerodynamics in the design of a windmill. In all of the forms of windmills which I have shown and described, airfoils are secured at the outer extremities of shafts radiating from the central hub of the wind wheel, the shafts having limited turning movements in the wind wheel hub for permitting the airfoils to assume operative positions with respect to the air stream and to assume inoperative positions out of the plane of rotation of the wind wheel. I have further provided means for converting the rotary motion of the wind wheel into reciprocatory movement of a pump rod, it being understood that the entire wind wheel is to be swiveled to a vertical anchorage such as a windmill tower. In all of my constructions I employ the principles of modern aerodynamics in causing the airfoils to operate, under load, at their most efficient angle with respect to the air stream. In all of my constructions except the Figure 4 construction, I also provide means for automatically picking up the load when the wind wheel has reached a predetermined velocity. In all of my constructions I have made use of the centrifugal force exerted on the airfoils either in the direction of the radius of rotation of the wind wheel or in the direction of the radius of the rocking movements of the airfoils on their shafts.

Figure 16:
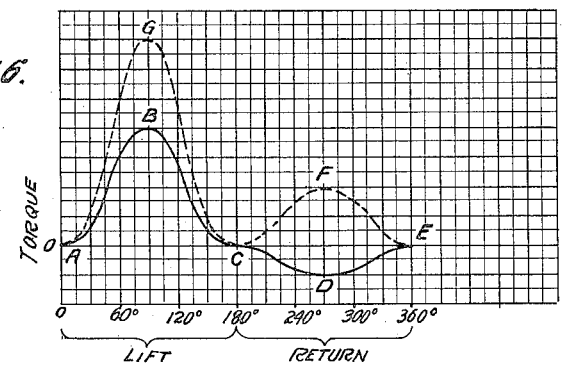
Fig. 16 is an illustrative diagram showing the torque necessary to move the reciprocating pumping mechanism at various points in the stroke.

Referring to Figure 16, I have shown diagrammatically, and for the purpose of illustration only, the torque necessary to move a reciprocating pumping mechanism, such as is driven by the wind wheel in this present application. It is to be understood that the illustration is entirely diagrammatic, and, therefore, I have given no definite torque values. In the graph shown I have indicated on the bottom horizontal line various degrees of movement of the reciprocating parts, starting at zero degrees and ending at 360. On the vertical line I have plotted torque, but since the graph is merely illustrative of a general condition which exists in wind mill practice, I have not given definite figures for the torque.

In Figure 16 the solid line indicates the torque necessary to move the parts where the pump rod moves freely. The dotted line represents the condition where there is a great deal of friction present, such as will be caused by new leathers in the pump cylinder, and other factors which introduce increased load due to relatively large friction. Referring to the solid line curve, A. B. C. represents the lift half of the stroke, and C. D. E. is the down, or return stroke, where the weight of the pump rod helps to turn the mill. The lift half of the stroke requires obviously a much greater torque than the return or down half of the stroke.

Where friction is high, the dotted line A. G. C. represents the lift half of the stroke, and C. F. E. the return or down half of the stroke. Actual conditions in various practical instances will in general lie somewhere between the full and dotted line curves. From an inspection of the curves, it will be apparent that the work is done principally on the lift half of the stroke. In operating conditions almost all mills will stop when the wind velocity is too low, somewhere between A. B. or A. G. on the lift half of the stroke. The points G. or B. represent the points of maximum torque in the pumping operation, and in considering the regulation of the clutching mechanism this maximum torque must be carefully retained in mind.

Figure 17:
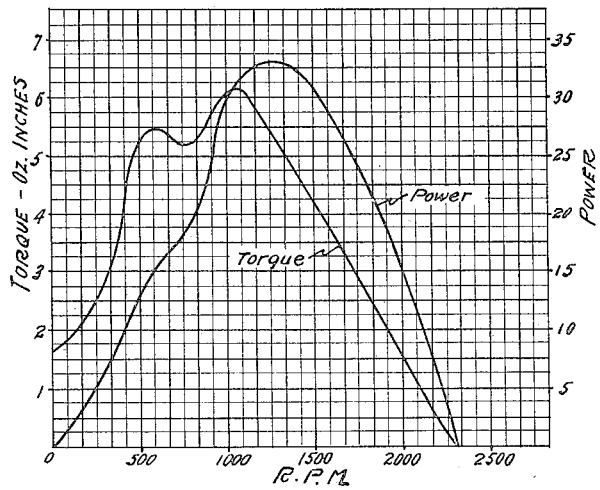
Fig. 17 is a graph showing torque and power generated by a high speed wheel.

In Figure 17 I have shown a graph in which the horizontal line designates revolutions per minute of the high speed wheel; the vertical line to the left represents torque in ounce inches and the vertical line to the right indicates the power. The figures used are merely illustrative, and the power curve was obtained by an arbitrary formula which nevertheless gives a true picture of the type of curve. For instance, in computing power the torque times the revolutions per minute was divided by two hundred, which is arbitrary but which for the purpose of explanation is sufficiently illustrative.

The curves appearing on Figure 17 were made from data obtained from a high speed wheel with three blades, and the curves in general would apply to other high speed wheels of the same general type, even though the number of blades differed. The blade section used is known in the trade as a Gottingen No. 523 blade. This type of blade gives a characteristic hump just ahead of the peak in the torque curve. In the curves for other types of high speed wheel the hump is not always present. The power in this particular test was greatest at approximately 1250 revolutions. The torque was greatest at approximately 1050 revolutions. This curve was made by operating the wheel in a wind blowing about fifteen miles an hour.

Figure 18:
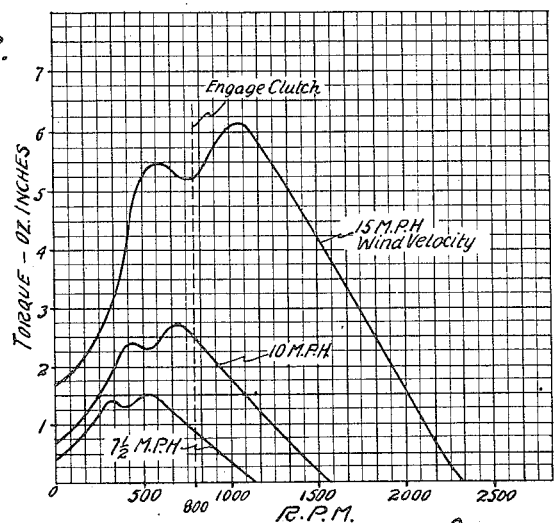
Fig. 18 is a graph showing a family of curves indicating the torque of a high speed wheel at various wind velocities, and various velocities of rotation.

Turning now to the family of curves, Figure 18, we see a series of curves similar to the torque curves on Figure 17. The fifteen mile an hour wind velocity curve is the same as that illustrated in the torque curve on Figure 17. The same wheel when operated in a ten mile an hour wind gave the curve shown in Figure 18, where the maximum torque was developed at a lower speed of revolution than was the case in the fifteen mile an hour wind. Again the same wheel had a maximum torque in a seven and one-half mile an hour wind at a little less than 600 revolutions per minute.

In any mill there is a definite wind velocity below which the wheel will not perform its function of pumping. In each mill this lowest possible operating wind velocity differs, depending on various factors of friction, weight of parts, load, and other operative characteristics.

In clutching a high speed wheel to its load to operate a pump mechanism, the clutching operation should be so adjusted that the clutching of the wheel to the pump mechanism must take place near the optimum speed of revolution of the wheel for the lowest practical wind velocity at which the mill is designed to operate. Obviously when the wind is at high velocity the speed at which the wind wheel is coupled to the pumping mechanism is not so critical, but at the lowest practical wind velocities the speed of revolution of the wheel is critical for there is a definite torque to be taken into consideration. The rotational inertia of the wheel itself is useful in lifting the pump rod when the energy in the wind is insufficient to meet the peak torque requirement.

My researches have shown that in the case of high speed wheels the clutching function must be exercised when the speed of the high speed wheel is greater than that which will develop its maximum torque at the lowest practical operating wind velocities. This enables the inertia of the wheel itself to supply part of the peak torque requirement of the pumping mechanism before the wheel has lost sufficient velocity of revolution to substantially pass the point of maximum torque.

As before explained in this specification, the wind wheel should be de-clutched from the pumping mechanism when its speed of rotation is substantially below that speed at which the clutching takes place, i. e., below that speed at which the maximum torque of the wheel is developed at low wind velocities.

It is desirable that the clutching mechanism be located between the pumping mechanism per se and the wheel, as this location of the clutching mechanism tends to reduce the element of static friction in starting the pumping mechanism and permits the device to be operated at lower wind velocities than would be the case for instance where the clutching is in the pump rod. This is very important, for friction is much higher at the start than when the parts are in motion. Unless my location of the clutching mechanism is employed, considerably more wind will be necessary to bring the wheel into motion.

For the particular wheel under discussion, the point at which the clutch should engage is about 800 R. P. M. At this speed, the inertia of the wheel is sufficient to carry it over the peak torque requirement of the average load, in a wind of 7½ M. P. H. The torque available from the wind will be sufficient to bring the wheel back up to 800 R. P. M. in time to meet the next peak requirement of the pumping mechanism.

I claim:

1. A windmill including a wind wheel and a clutch, said wind wheel having radially pivoted vanes movable outwardly under the action of centrifugal force to change the pitch of said vanes and to automatically engage said clutch at a predetermined speed of rotation of said wind wheel.

2. A windmill including a wheel shaft and blades, said blades having shafts projecting radially from said wheel shaft, said blade shafts being automatically extensible and contractible in accordance with the varying speeds of said wind wheel and having arcuate movements about their axes, and means responsive to the extensible and arcuate movements of said blade shafts for automatically picking up the load at a predetermined speed of rotation of said wind wheel.

3. A windmill including a wind wheel having a shaft, a plurality of vanes, radial vane shafts connecting said vanes to said wind wheel shaft, said vane shafts being extensible and contractible in response to the centrifugal force at varying speeds of rotation of said wind wheel, a power takeoff, a clutch between said wind wheel and said power takeoff, and means responsive to the movements of extension of said vane shafts for causing the engagement of said clutch at a predetermined speed of rotation of said wind wheel.

4. In a windmill, a wind wheel adapted to rotate at a relatively high speed, pumping mechanism, a clutch to clutch the pumping mechanism and the wheel, and means to cause the clutch to operate at such a velocity of rotation of the wheel that the clutch is engaged when the speed of the wheel is greater than that at which it will develop its maximum torque at low wind velocity and disengaged at a wheel speed below that of maximum torque for such low wind velocity.

5. In a windmill, a wind wheel adapted to rotate at a relatively high speed, reciprocating pumping mechanism driven by said wind wheel and means for releasing said wind wheel from its load when its speed of rotation is below that corresponding to maximum torque in a wind of low velocity.

6. In a windmill, a wind wheel adapted to rotate at a relatively high speed, reciprocating pumping mechanism driven by said wind wheel, and clutching means located between the wind wheel and the reciprocating pumping mechanism and adapted to clutch the wind wheel to the pumping mechanism.

7. In a windmill, a wind wheel adapted to rotate at a relatively high speed, pumping mechanism, a clutch to clutch the pumping mechanism and the high speed wheel, and means to cause the clutch to operate at such a velocity of rotation of the high speed wheel that the clutching operation is initiated while the speed of rotation of the high speed wheel is greater than that at which it will generate its maximum torque at low wind velocity.

8. In a windmill, a wind wheel, pumping mechanism, a clutch to clutch the pumping mechanism and the wind wheel, and means to cause the clutch to operate so that it engages at a greater speed than it disengages.

9. In a windmill, a wind wheel adapted to rotate at a relatively high speed, pumping mechanism, a clutch to clutch the pumping mechanism and the high speed wheel, and means to cause the clutch to engage at such a velocity of rotation of the high speed wheel that the rotational inertia of the wheel is sufficient to carry the pumping mechanism over the peak torque requirement thereof under average load.

10. In a windmill, a wind wheel adapted to rotate at relatively high speed, pumping mechanism, a clutch to clutch the pumping mechanism and the high speed wind wheel, and means to cause the clutch to operate so that it engages at a greater speed than it disengages.

11. A windmill including a wind wheel having radial blades of airfoil section, a pumping mechanism, a clutch to clutch said wheel to said pumping mechanism, means for locking the said blades in an inoperative position edgewise to the wind direction, and means for causing the blades to assume positions between the running position and the out of gear position for regulating the speed of said wheel in high winds.

HENRY SCHLACHTER.